US009499955B2

(12) United States Patent
Kiest, Jr. et al.

(10) Patent No.: US 9,499,955 B2
(45) Date of Patent: Nov. 22, 2016

(54) METHOD AND MEANS OF LINING A MANHOLE

(71) Applicant: LMK TECHNOLOGIES, LLC, Ottawa, IL (US)

(72) Inventors: Larry W. Kiest, Jr., Ottawa, IL (US); Jason M. Mathey, Oglesby, IL (US)

(73) Assignee: LMK Technologies, LLC, Ottawa, IL (US)

( * ) Notice: Subject to any disclaimer, the term of this patent is extended or adjusted under 35 U.S.C. 154(b) by 761 days.

(21) Appl. No.: 13/847,820

(22) Filed: Mar. 20, 2013

(65) Prior Publication Data

US 2013/0213551 A1 Aug. 22, 2013

Related U.S. Application Data

(62) Division of application No. 12/943,394, filed on Nov. 10, 2010.

(51) Int. Cl.
*B29C 63/34* (2006.01)
*E02D 29/12* (2006.01)

(52) U.S. Cl.
CPC ............. *E02D 29/128* (2013.01); *B29C 63/34* (2013.01); *E02D 29/12* (2013.01)

(58) Field of Classification Search
CPC ................. E02D 29/125; E02D 29/128; B29C 63/28; B29C 63/34
See application file for complete search history.

(56) References Cited

U.S. PATENT DOCUMENTS

| | | | | |
|---|---|---|---|---|
| 5,322,653 A | * | 6/1994 | Muller | B29C 63/28 264/136 |
| 5,736,077 A | * | 4/1998 | Kamiyama | B29C 63/28 264/32 |
| 5,765,597 A | * | 6/1998 | Kiest, Jr. | B29C 63/36 264/269 |

* cited by examiner

*Primary Examiner* — Alison L Hindenlang
(74) *Attorney, Agent, or Firm* — Nyemaster Goode, P.C.

(57) ABSTRACT

An apparatus and method is provided for lining the wall of a manhole. The apparatus may include a liner assembly, which includes an expansion device, an auxiliary bladder, a primary bladder, and a liner. The auxiliary bladder is first inflated near the top of the manhole. Next the primary bladder may be expanded to press the liner against the wall of the manhole. The liner, being impregnated with a resinous material, is pressed against the wall until the resinous material cures and hardens. The expansion device, auxiliary bladder, and primary bladder are then removed from the manhole. The result is a repaired manhole wall.

26 Claims, 12 Drawing Sheets

METHOD AND MEANS OF LINING A MANHOLE

CROSS-REFERENCE TO RELATED APPLICATIONS

This application is a Divisional Application of U.S. Ser. No. 12/943,394, filed Nov. 10, 2010, and hereby incorporated in its entirety.

FIELD OF THE INVENTION

The present invention relates generally to a method and means for repairing a manhole. More particularly, but not exclusively, it relates to a method and assembly for lining a manhole wall.

BACKGROUND OF THE INVENTION

Conventional manholes include a lower or bottom pad, a barrel having a relatively constant diameter adjacent the pad, a concentric or eccentric cone extending upwardly from the barrel, one or more adjusting rings to adjust the overall height of the manhole, and a casting frame on top of the adjusting rings to support a lid at an elevation substantially level with the surrounding pavement. The casting frame is preferably sealed to the uppermost adjusting ring to preclude or minimize water flow into the manhole.

One problem with existing manholes is that many were made long ago, and then oftentimes were made of brick. Due to the old age of the manholes, as well as the materials used to make them, many manholes have begun to deteriorate or have damaged areas. The damaged areas create weak spots, which may allow water to infiltrate the sewer system and also lead to the eventual collapse of the manhole.

Methods exist for repairing the walls of manholes. One such method involves the use of a liner and a bladder to repair the manhole wall. The liner and bladder are placed in the manhole, and the bladder is expanded to press the liner against the manhole wall. The liner is impregnated with a resin and pressed against the manhole wall. One problem with this method is that the liner must stretch circumferentially as the bladder expands. Many liners, when stretched circumferentially, will shrink longitudinally to make up for the extra perimeter length needed. Due to the shape of manholes and how bladders expand, liners may affix first approximately midway along the depth of the manhole. Therefore, when the top portion of the liner stretches circumferentially, it does not have the requisite material to take from to account for the larger circumference. Because the liner is anchored at the casting and at the midpoint along the wall of the manhole, this may cause the liner to rip or not fit tightly against the manhole wall to properly repair the wall.

Accordingly, there is a need in the art for an improved method and means that overcomes the problems of a liner ripping or tearing when the liner stretches circumferentially due to the liner becoming affixed to the manhole wall at an undesired first location. Also, this same problem occurs to non-stretching liners, as the length of the liner must be increased as the bladder expands, pressing the liner against the manhole wall.

BRIEF SUMMARY OF THE INVENTION

It is therefore a principal object, feature, or advantage of the present invention to provide an improved method and means for lining a wall of a manhole which improves over or solves the problems and deficiencies in the art.

Another object, feature, or advantage of the present invention is to provide an improved means and method to line a manhole wall with a liner so that the liner does not rip or tear during lining.

Another object, feature, or advantage of the present invention is to provide an improved method and means of lining a manhole having various sizes.

Another object, feature, or advantage of the present invention is to provide a method and means to line a manhole from the top of the manhole downwardly to reduce rips and/or tears in the liner.

Another object, feature, or advantage of the present invention is to provide a method and means for lining a manhole of various sizes from the bottom of the manhole upwardly to reduce rips and/or tears in the liner.

These and/or other objects, features, and advantages of the present invention will be apparent to those skilled in the art. The present invention is not to be limited to or by these objects, features and advantages, and no single embodiment need exhibit every object, feature, and advantage.

According to one aspect of the present invention, a liner assembly for repairing a wall of a manhole is provided. The liner assembly includes an auxiliary bladder, a primary bladder at least partially surrounding the auxiliary bladder, and a liner at least partially surrounding the primary bladder. The liner is adapted to contact the wall of the manhole.

According to another aspect of the present invention, a method of lining a manhole is provided. The method includes providing a liner impregnated with a resinous material capable of curing and hardening. The liner is positioned in the manhole. A top portion of the liner is expanded to press against a wall of the manhole. Next, a lower portion of the liner is expanded to press against the wall of the manhole. The liner is then allowed to cure and harden.

According to another aspect of the present invention, a method of lining a manhole is provided. The method includes providing a liner assembly including an expansion device, an auxiliary bladder operably connected to the expansion device, a primary bladder at least partially surrounding the auxiliary bladder, and a liner at least partially surrounding the primary bladder, with the liner being impregnated with a resinous material capable of curing and hardening. The liner assembly is positioned in the manhole. The auxiliary bladder is expanded to press a first portion of the liner against a manhole wall. The primary bladder is then expanded to press a second portion of the liner against the manhole wall. The liner is allowed to cure and harden. The expansion device, auxiliary bladder, and primary bladder are then removed from the manhole.

According to another aspect of the present invention, a liner assembly for repairing the wall of a manhole is provided. The liner assembly includes a bladder, a liner holding device, and a liner. The bladder comprises a first end positioned near an opening of the manhole, and a bladder body positioned in the manhole. The liner holding device is positioned at least partially above the opening of the manhole. The liner includes a first end operably connected to the excess device, and a liner body positioned at least partially surrounding the bladder in the manhole. The liner holding device is adapted to feed a portion of the liner body into the manhole during expansion of the liner body.

According to another aspect of the present invention, a method of lining a manhole from a bottom of the manhole upwardly is provided. A manhole liner is provided having a first end, an opposite second end, and a liner body there between, and the liner capable of stretching circumferentially, is provided. A resinous material capable of curing and hardening is applied to a manhole liner. The liner is positioned in the manhole, with the first end and excess liner body at least partially outside the manhole. A bladder is inserted into the liner. The bladder is expanded with a liquid to press the liner against the wall of the manhole, the bladder expanding at the bottom of the manhole first and expanding circumferentially upwardly towards a manhole opening. Excess liner body is inserted into the manhole, and the resinous material is allowed to cure and harden. The bladder is removed from the manhole.

According to another aspect of the present invention, a method of lining a manhole from a bottom of the manhole upwardly is provided. The method includes taking a manhole liner having a resin absorbent layer and a fluid-impervious layer, the liner having a liner body extending between a first end and an opposite second end and being capable of stretching circumferentially. A resinous material capable of curing and hardening is applied to the liner. The liner is positioned in the manhole with the first end and an excess portion of the liner body at least partially outside the manhole. The liner is then expanded with a liquid to press the liner against a wall of the manhole. The liner will expand at the bottom of the manhole first and will continue to expand circumferentially and upwardly towards the manhole opening. The excess portion of the liner body is inserted into the manhole, and the resinous material is allowed to cure and harden.

According to yet another aspect of the present invention, a method of lining a manhole is provided. The method includes providing a liner assembly including an expansion device, an auxiliary device operably connected to the expansion device, a primary bladder disposed adjacent the auxiliary bladder and operably connected to the expansion device, and a liner surrounding the auxiliary bladder and at least partially surrounding the primary bladder. The liner is impregnated with a resinous material capable of curing and hardening. The liner assembly is positioned in a manhole with the auxiliary bladder above the primary bladder. The auxiliary bladder is expanded to press a first portion of the liner against a manhole wall. Next, the primary bladder is expanded to press a second portion of the liner against the manhole wall. The liner is allowed to cure and harden, and then the expansion device, auxiliary bladder, and primary bladder are removed from the manhole.

DETAILED DESCRIPTION OF THE PREFERRED EMBODIMENTS

Figure 1:
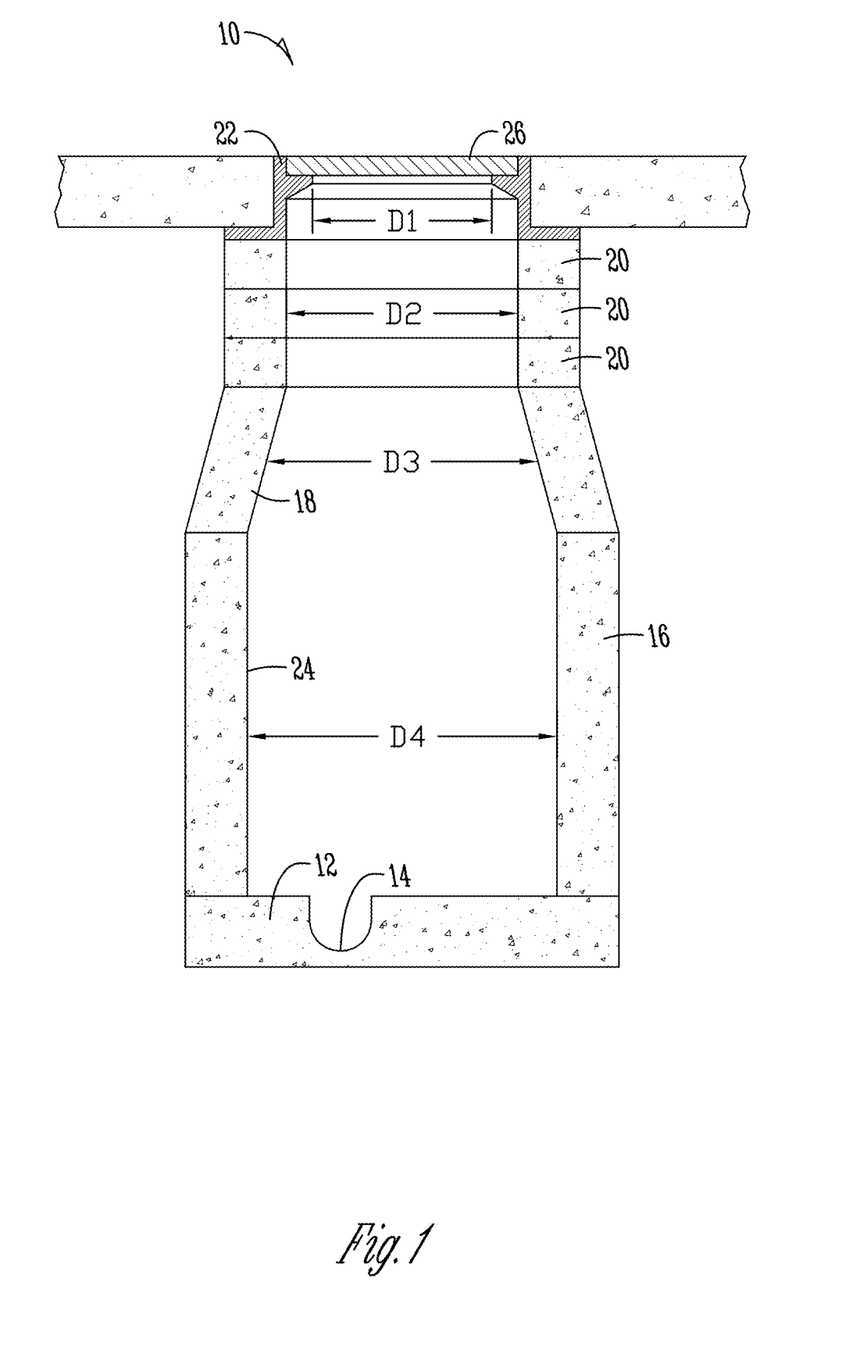
FIG. 1 is a sectional view of an exemplary structure of a manhole.

A typical manhole 10 has a floor 12 that includes a run through 14. The floor 12 is attached to a barrel 16, a cone section 18, and a plurality of adjusting rings 20. A casting frame 22 is mounted at the upper end of the manhole 10. On top of the casting frame 22 sits a lid 26. As shown in FIG. 1, the manhole 10 includes a number of diameters D1, D2, D3 and D4. While all manholes generally have areas of different diameters, the exact shape and size of the manholes will vary. For example, FIG. 1 shows a manhole 10 having a concentric cone section, but other manholes may have eccentric cone sections. A manhole wall 24 may be formed of brick, and the bricks may become spaced apart from one another. This may cause defects and cracks in the wall 24 of the manhole 10, which necessitate repair. The repair may be needed along the entire wall 24 of the manhole 10, or in a more localized spot. However, it is generally desired to repair the wall 24 of the manhole 10 from the floor 12 up to or near the casting frame 22 of the manhole 10, which covers the full depth of the manhole.

Figure 2:
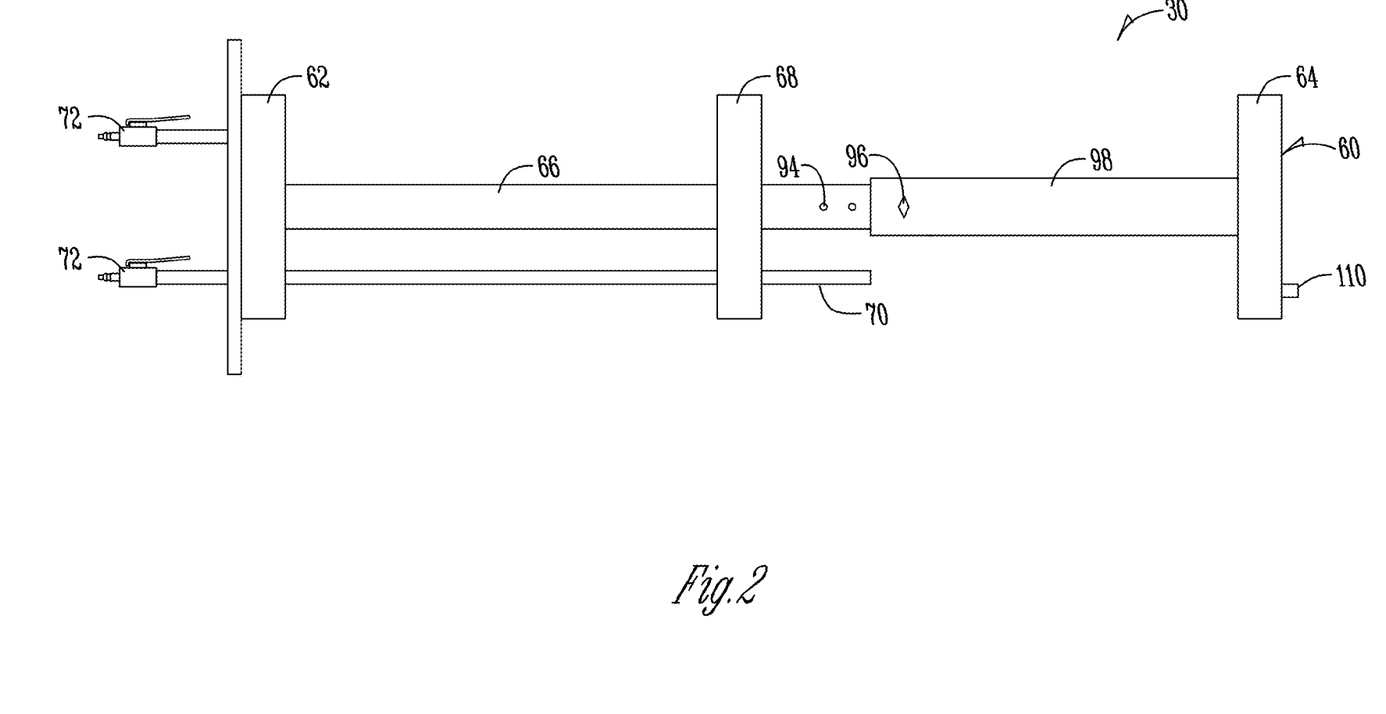
FIG. 2 is a perspective view of one embodiment of an expansion device used in lining a manhole.

FIG. 2 is a perspective view of one embodiment of an expansion device 60, which may be used in lining a manhole 10. As shown in FIG. 2, the expansion device 60 includes a first end cap 62, an opposite second end cap 64, and a connecting member 66 therebetween. The connecting member 66 may be solid, or as shown in FIG. 2, the member may be adjustable. If the member 66 is adjustable, the expansion device 60 may also include a connecting member receiver 98 for receiving the connecting member 66. The connecting member 66 may include adjusting holes 94 for selectively adjusting the height of the connecting member 66. When a desired height is attained, a locking bolt 96, or other locking means, can be placed through the adjusting hole 94 of the connecting member 66 to lock the expansion device 60 at the desired height. The expansion device 60 also includes an auxiliary end cap 68 located on the connecting member 66 between the first end cap 62 and the second end cap 64 of the expansion device 60. As further shown in FIG. 2, the expansion device 60 includes an air supply 70 extending from the first end cap 62 and through the auxiliary end cap 68. The air supply 70 may include a plurality of holes (not shown) through which air or a like gas may be dispersed to inflate a bladder. Additionally, the expansion device 60 may include one or more pneumatic hookups 72 located on the first end cap 62 of the expansion device 60.

Figure 3:
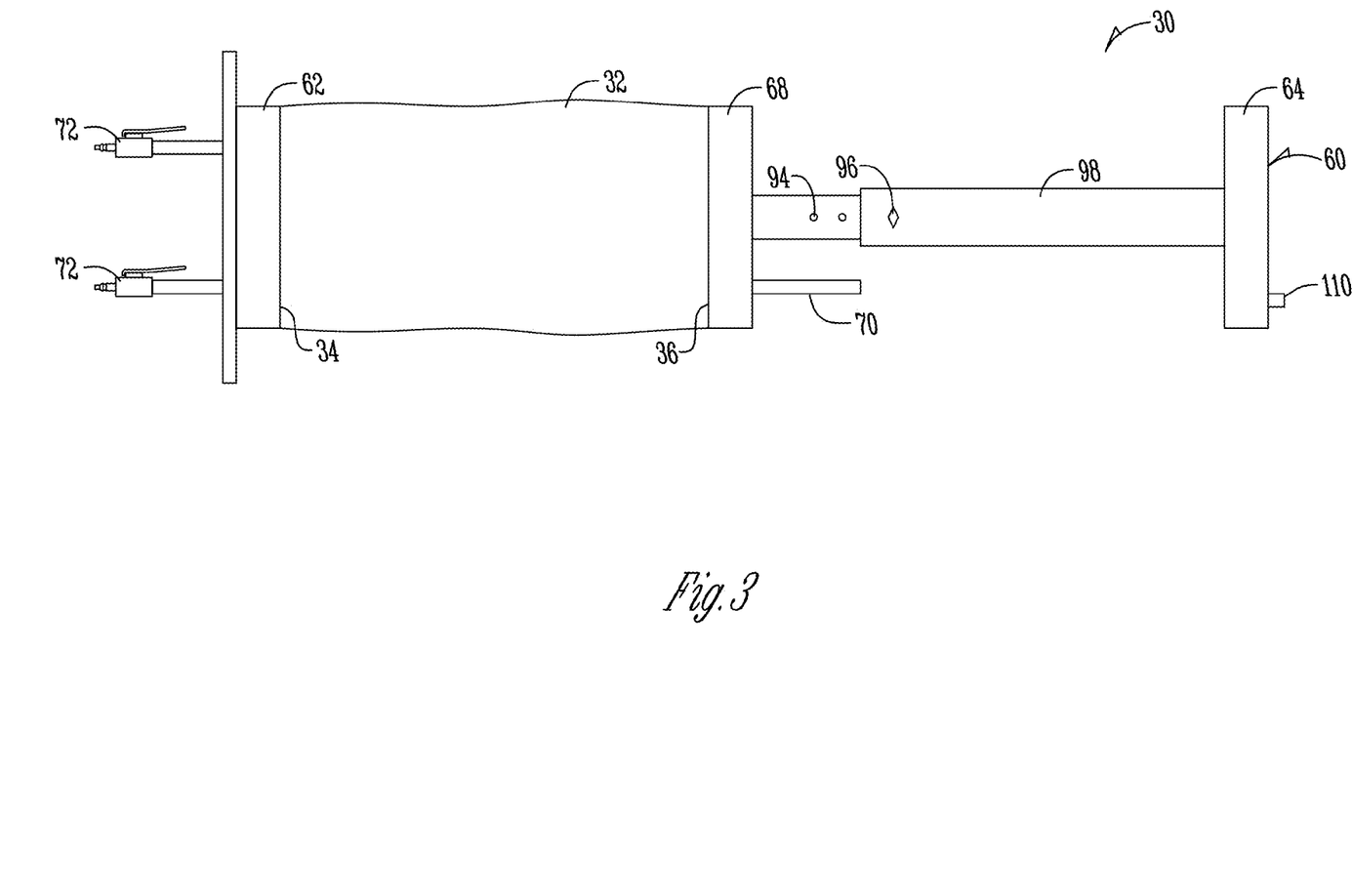
FIG. 3 is a perspective view of one embodiment of a liner assembly, showing an auxiliary bladder attached to the expansion device.

FIG. 3 is a perspective view of the expansion device 60 of FIG. 2, but including an auxiliary bladder 32 attached to the expansion device 60. The auxiliary bladder 32 has a first end 34 and an opposite second end 36. The first end 34 of the auxiliary bladder 32 is attached at the first end cap 62 of the expansion device 60. The second end 36 of the auxiliary bladder 32 is attached at the auxiliary end cap 68 of the expansion device 60. The auxiliary bladder 32 is attached at the expansion device 60 in a number of ways, including but not limited to, by tape, by glue, or by screws or nuts. As shown in FIG. 3, the inflation bar 70 extends through the auxiliary end cap 68 and outside of the auxiliary bladder 32. Therefore, the inflation bar 70 is able to be used to inflate additional bladders beyond the auxiliary bladder 32.

Figure 4:
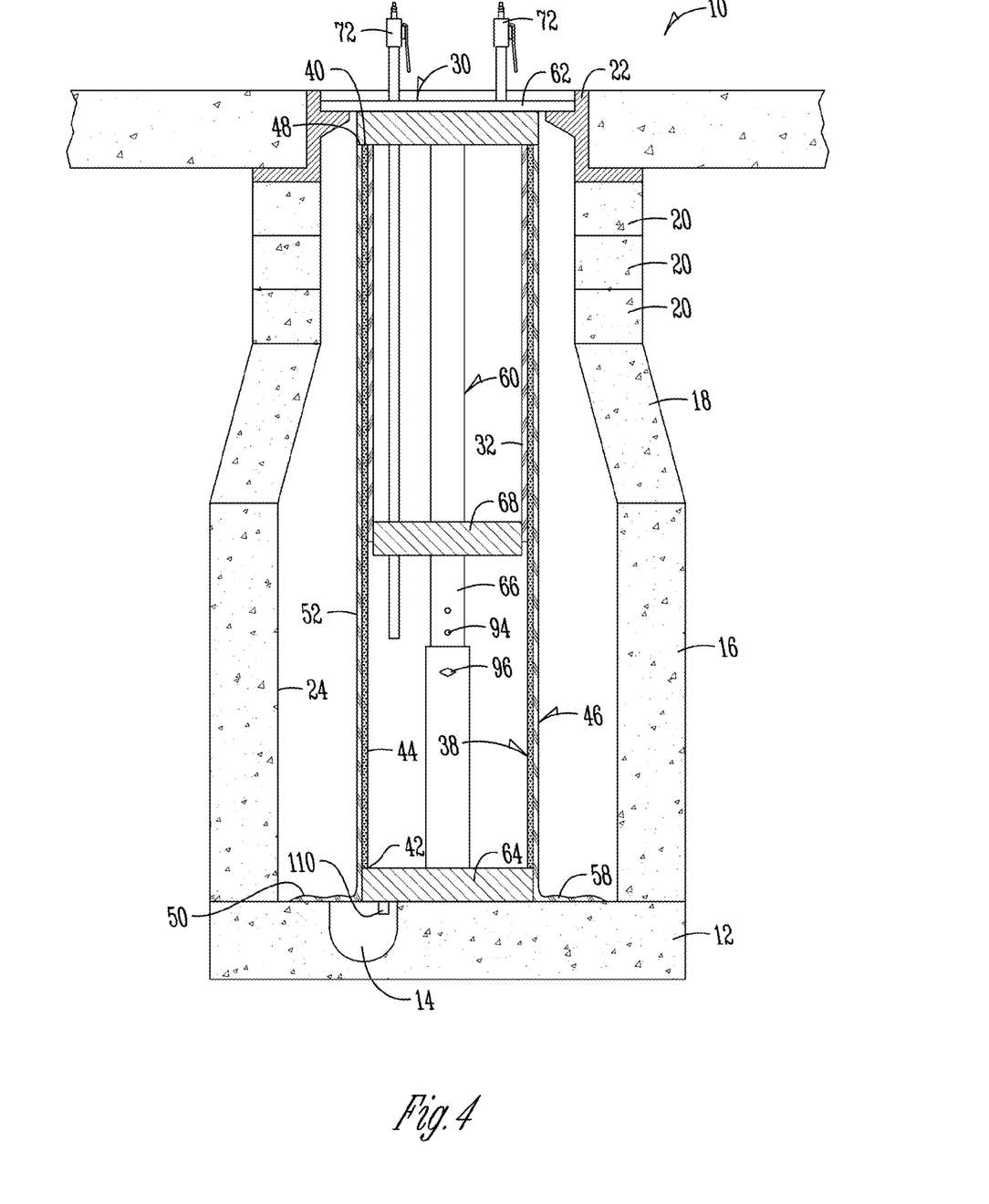
FIG. 4 is a sectional view of one embodiment of a liner assembly positioned in a manhole prior to inflation of any bladder.

FIG. 4 shows a sectional view of one embodiment of a liner assembly 30, including the expansion device 60 of FIGS. 2 and 3, positioned in a manhole 10 prior to the inflation of any bladder. The liner assembly 30 includes the expansion device 60, an auxiliary bladder 32, a primary bladder 38, and a liner 46. As described in FIG. 3, the auxiliary bladder 32 includes a first end 34 attached at a first end cap 62 of the expansion device 60, and a second end 36 attached at the auxiliary end cap 68 of the expansion device 60. The primary bladder 38 includes a first end 40 attached at the first end cap 62 of the expansion device 60, a second end 42 attached at the second end cap 64 of the expansion device 60, and a primary bladder body 44 extending therebetween and at least partially surrounding the auxiliary bladder 32. The liner 46 includes a first end 48 attached at the first end cap 62 of the expansion device 60, a second end 50 positioned in the bottom 92 of the manhole 10, and a liner body 52 therebetween and at least partially surrounding the primary bladder 38. Additionally, the liner body 52 is impregnated with a resinous material capable of curing and hardening. The resinous material may be a thermoset resin, which cures quicker when introduced to steam or another heated fluid. In this embodiment, the length of the liner 46 is greater than the depth of the manhole 10 so as to create excess liner body 58 in the manhole 10. The excess liner body 58 may be found at the bottom of the manhole 10. The liner assembly 30 is positioned in the manhole 10. The connecting member 66 of the expansion device 60 is adjusted so that the first end cap 62 of the expansion device 60 is near the manhole opening 28 when the second end cap 64 of the expansion device 60 is resting on the manhole floor 12 of the manhole 10. Having the correct liner length ensures that the entire manhole wall 24 is repaired.

Figure 5:
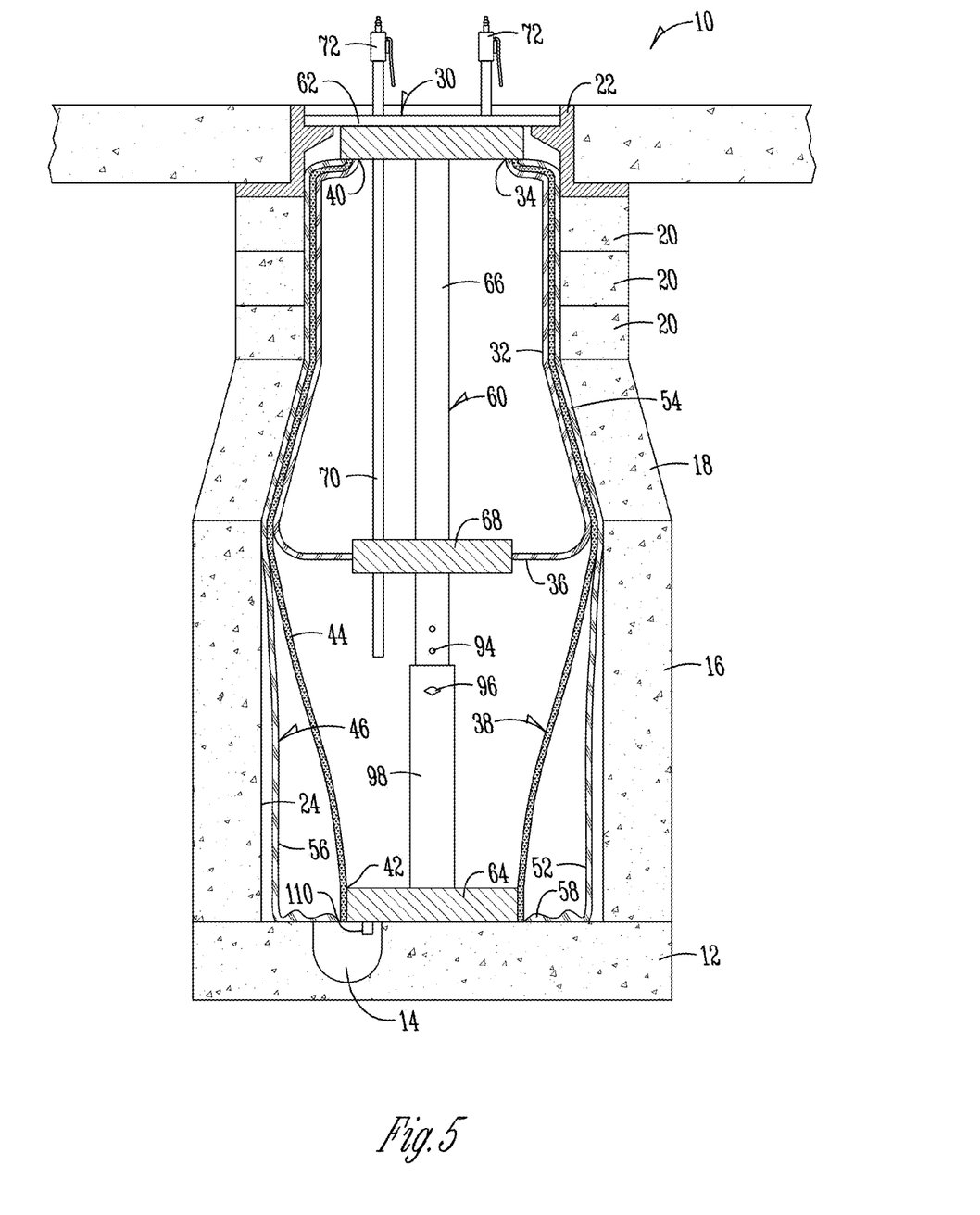
FIG. 5 is a sectional view similar to FIG. 4, but showing the auxiliary bladder inflated in the manhole.

FIG. 5 is a sectional view of the liner assembly 30 of FIG. 4, but showing the auxiliary bladder 32 inflated in the manhole 10. Air or another gas is pumped through a pneumatic hookup 72 located on the first end cap 62 of the expansion device 60. This causes the auxiliary bladder 32 to expand outwardly towards the manhole wall 24. Because the auxiliary bladder 32 is connected to the first end cap 62 and the auxiliary end cap 68 of the expansion device 60, only that section will expand circumferentially. The expansion causes the liner 46 to be pressed against the wall 24 of the manhole 10. However, only a first portion 54 of the liner 46 will be pressed against the wall 24 of the manhole 10. The first portion 54 of the liner 46 comprises the portion of the liner body 52 starting near the first end cap 62 of the expansion device 60 and ending near the auxiliary end cap 68 of the expansion device 60. Because the first portion 54 of the liner 46 is stretched circumferentially, and thus shrinks in length, excess liner body 58 is required. The additional liner body will be taken from the excess liner body 58 which was positioned near the floor 12 of the manhole 10. This ensures that the entire first portion 54 of the liner 46 will be pressed against the manhole wall 24 without the liner body 52 ripping or tearing.

Figure 6:
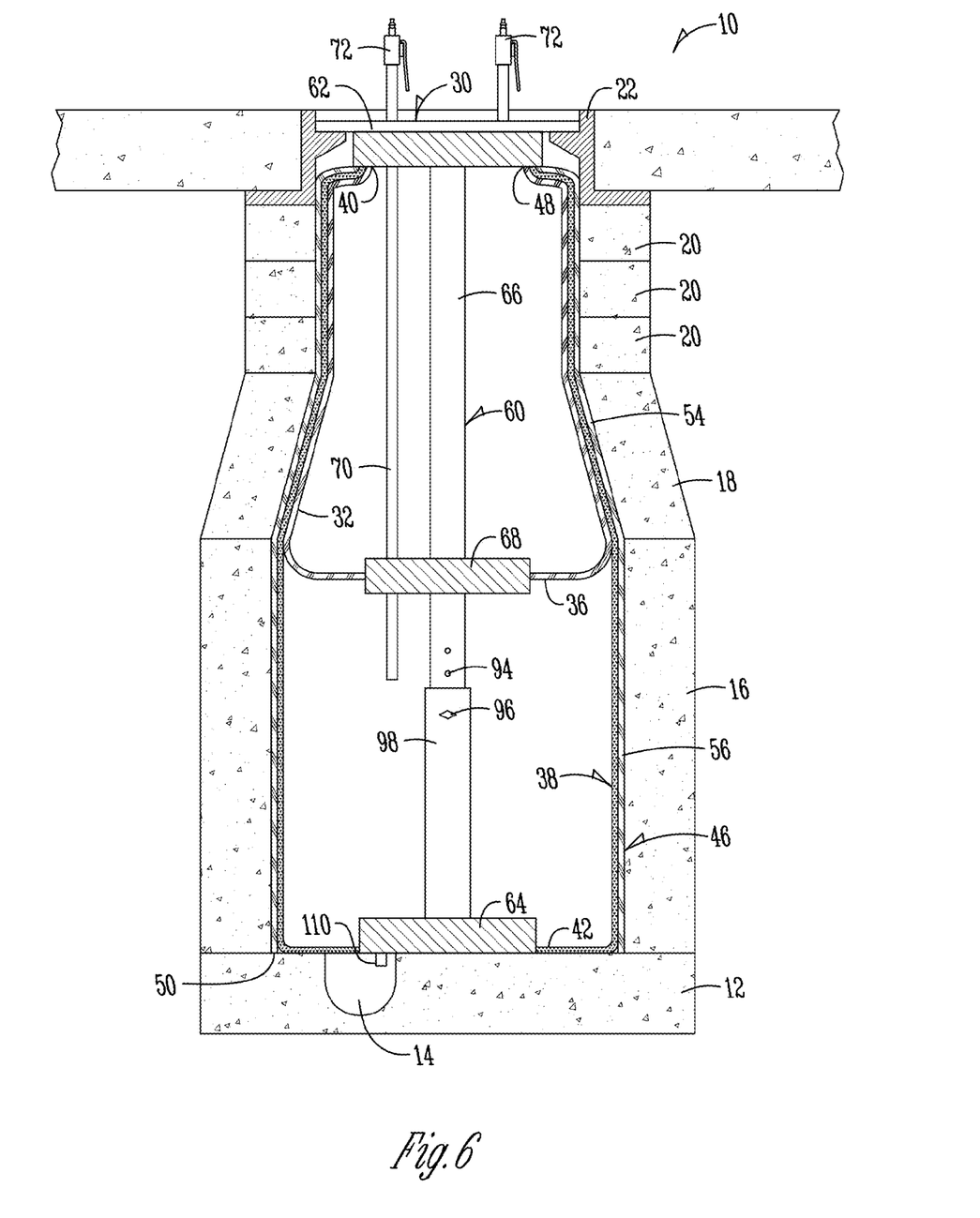
FIG. 6 is a sectional view similar to FIG. 5, but showing both the auxiliary bladder and a primary bladder inflated in the manhole.

FIG. 6 shows the liner assembly 30 of FIGS. 4 and 5, but with the primary bladder 38 fully inflated in the manhole 10. After the auxiliary bladder 32 has been expanded and has pressed a first portion 54 of the liner 46 against the wall 24 of the manhole 10, the primary bladder 38 will be inflated to press a second portion 56 of the liner 46 against the remaining portion of the manhole wall 24. The primary bladder 38 is inflated by the air supply 70 of the expansion device 60. Air is pumped through the air supply 70 to inflate the primary bladder 38. It should be appreciated, however, that steam may also be used to inflate the primary bladder 38 to speed cure time of the resinous material which has impregnated the liner 46. In the case where steam is used to inflate and cure the liner 46 with resin, an exhaust port 110 is positioned in the second end cap 64, allowing steam and condensation to escape the expansion device 60. While the exhaust port 110 is shown on the bottom of the second end cap 64, it should be noted that it could be placed anywhere in the cap to best allow the condensation and excess steam to escape. As additional steam is introduced into the expansion device 60, more pressure is introduced into the expansion device than that which is exhausted. The difference is the actual pressure applied to the bladders to expand and press the liner 46 against the manhole wall. Removing the condensation is an advantage, since condensation insulates the liner 46 from the heat source and can result in soft or uncured areas in the liner.

The primary bladder 38 presses the remaining portion of the liner 46 against the wall 24 of the manhole 10. The bladder causes the liner 46 to stretch circumferentially, which in turn causes the liner to shrink longitudinally. Due to this shrinkage, the liner 46 must use a portion of the excess liner body 58 to ensure that no rips or tears are formed in the liner 46. Once both the first portion 54 and the second portion 56 of the liner 46 have been pressed against the manhole wall 24, the bladders will remain inflated until the resinous material of the liner 46 has a chance to cure and harden. After this occurs, both the primary bladder 38 and the auxiliary bladder 32 are deflated and the expansion device 60, auxiliary bladder 32, and primary bladder 38 are removed from the manhole 10. The cured liner 46 will remain in the manhole 10, forming a new manhole wall 24.

Figure 7A:
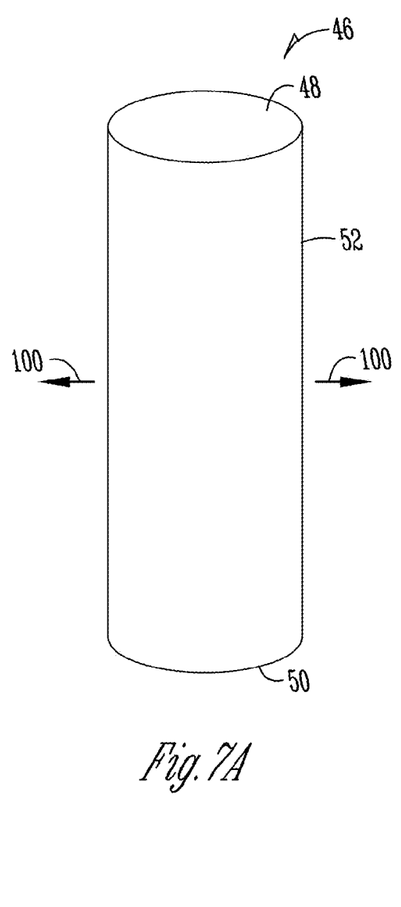
FIG. 7A is a perspective view of a manhole liner.
Figure 7B:
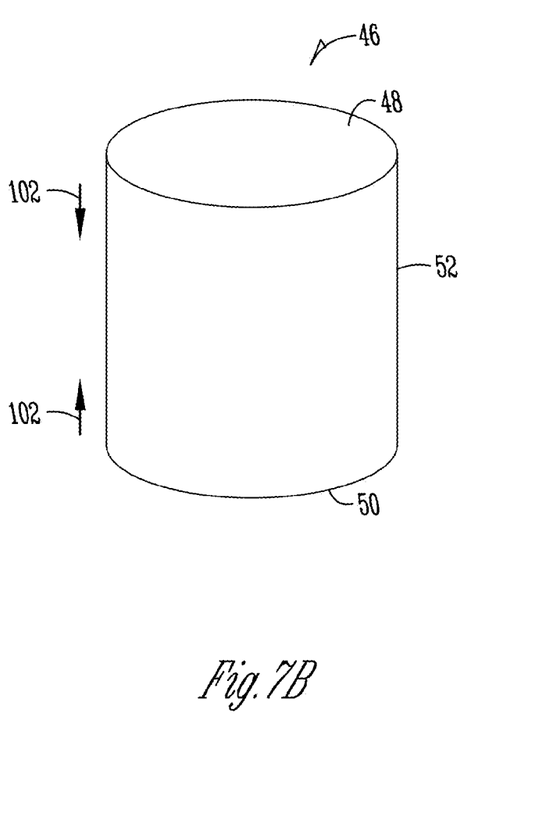
FIG. 7B is a perspective view of the liner of FIG. 7A, showing the effect of stretching the liner circumferentially.

FIGS. 7A and 7B are perspective views of one style of liner 46 suitable for use with the present invention. The liner is of the kind described in U.S. Pat. No. 7,670,086, herein incorporated in its entirety. FIG. 7A shows the liner 46 having a first end 48, an opposite second end 50, and a liner body 52 therebetween. As shown by the arrows 100, the liner 46 is able to expand and stretch circumferentially. The liner is able to stretch to a diameter that is greater than its unstretched diameter, preferably by 150%. FIG. 7B shows the effects on the liner 46 of stretching circumferentially, however. When the liner 46 is stretched circumferentially, the liner 46 will shrink longitudinally. This is shown in FIG. 7B by the arrows 102. The liner 46 will shrink longitudinally because the liner requires more material to expand circumferentially, and it obtains this by shrinking longitudinally.

It should be appreciated, however, that other liners may be used with the present invention. For instance, the liner 46 shown and described in FIGS. 7A and 7B is sized to the smallest diameter D1 of the manhole 10. The liner 46 is then able to stretch circumferentially to press against the wall 24 of the manhole 10. However, it should be appreciated that the liner 46 may also be sized to the largest diameter D4 of the manhole 10. In such a case, the liner should preferably be free of resin impermeable coatings and the bladder sized equal to or smaller than the smallest diameter of the manhole so as to accommodate folds in the liner while still providing a smooth interior surface. However, whether the liner 46 is sized to the smallest or largest diameter of the manhole 10, excess liner is required. Because the liner 46 is suspended from the top of the manhole 10 and is taut, the distance from the top of the manhole to the floor 12 is less than the distance along the wall of the manhole from the top to the floor. Thus, excess liner is required to contact the entire length of the manhole wall 24.

The liner 46, impregnated with a resinous material is able to fold over itself, thus dispensing the resinous material. The auxiliary bladder 32 and the primary bladder 38 expand to create a smooth surface against the manhole wall 24. Thus, the resinous material would cure smoothly leaving a smooth new wall 24 of the manhole 10.

Figure 12:
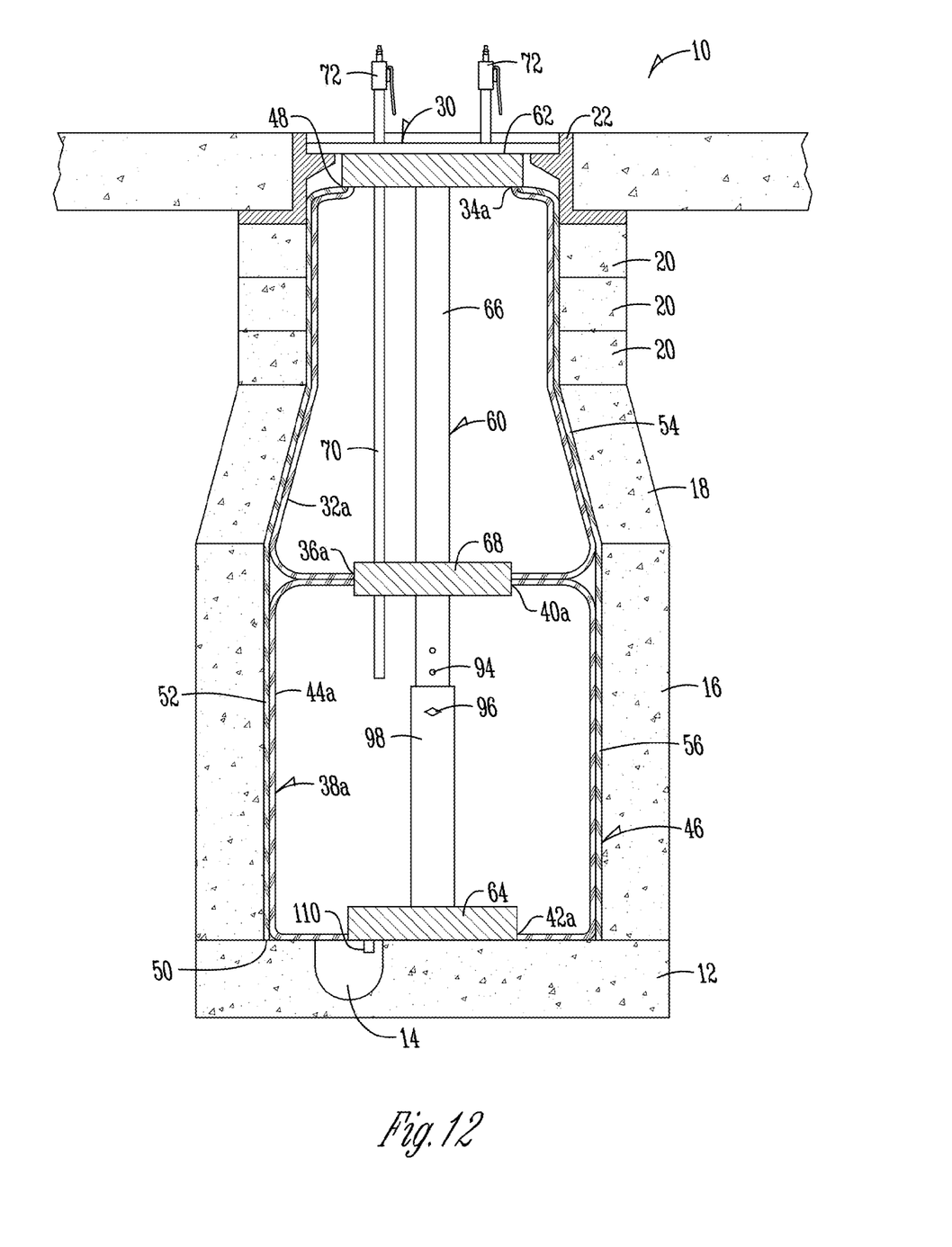
FIG. 12 is a sectional view similar to FIG. 5, but for an alternative embodiment.

As described in the embodiment above, the primary bladder 38 surrounds the auxiliary bladder 32. An alternative is to stack the bladders, as shown in FIG. 12. Here, the auxiliary bladder 32a is still attached to the first end cap 62 and the auxiliary end cap 68 of the expansion device 60. However, the primary bladder 38a no longer surrounds the auxiliary bladder 32a, but is positioned below the auxiliary bladder. The primary bladder 38a extends between the auxiliary end cap 68 and the second end cap 64, as shown in FIG. 12. The auxiliary bladder 32a is first inflated, to press the first portion 54 of the liner 46 against the manhole wall 24. Next, the primary bladder 38a is inflated to press the remainder the liner against the wall 24. The auxiliary and primary bladders 32a, 38a are shown fully inflated in FIG. 12.

Figure 8:
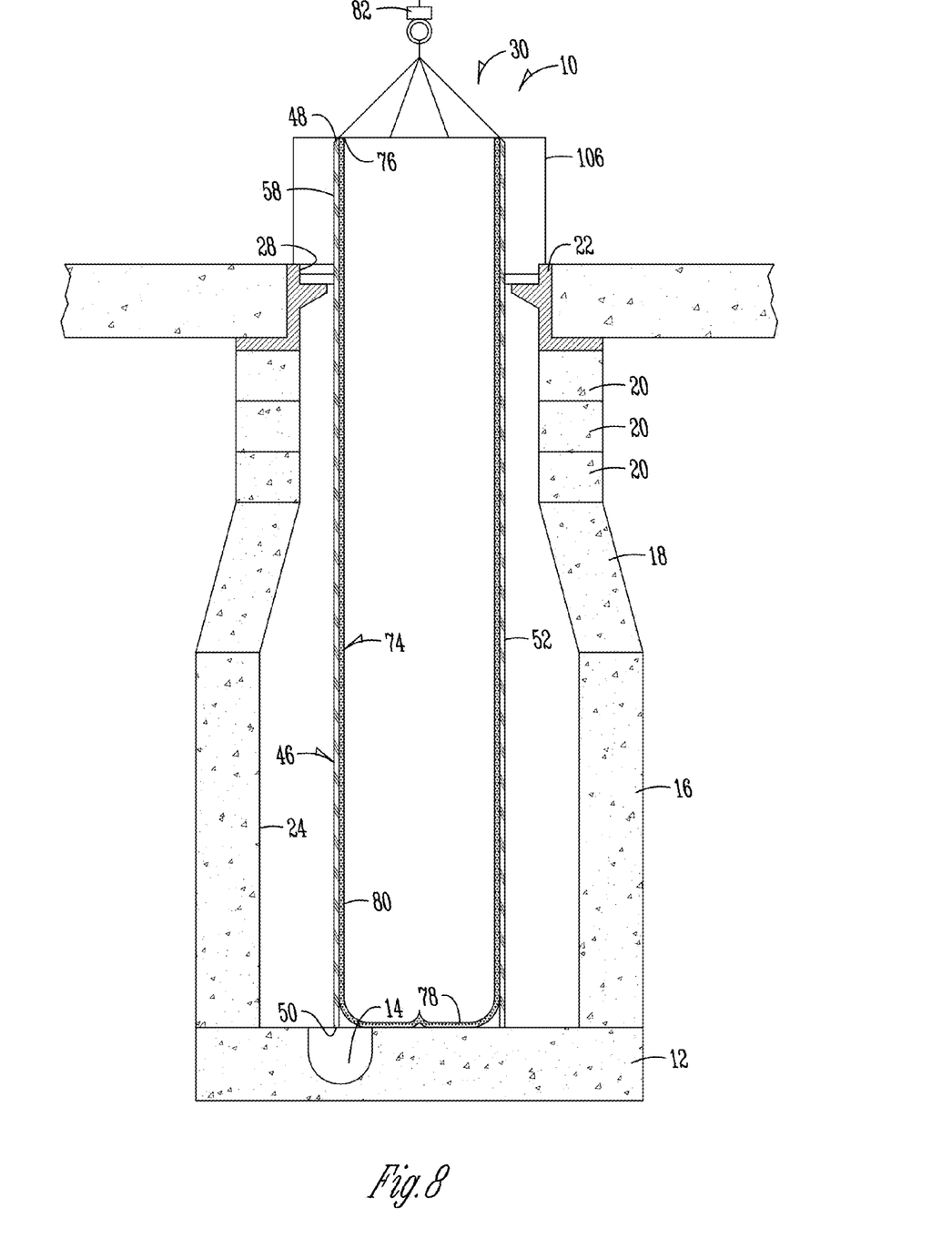
FIG. 8 is a sectional view of another embodiment of the present invention positioned in a manhole.

FIG. 8 shows a sectional view of another embodiment of a liner assembly 30 of the present invention positioned in the manhole 10. In this embodiment, the liner assembly 30 includes a bladder 74, a liner holding device 82, and a liner 46. The bladder 74 includes a first end 76, a second end 78 positioned at the floor 12 of the manhole 10, and a bladder body 80 therebetween. The first end 76 of the bladder 74 may be attached to a bladder base 106, which may be fixed near the manhole opening 28, or outside of the manhole 10. The liner 46 includes a first end 48 attached to a liner holding device 82, a second end 50 positioned near the floor 12 of the manhole 10, and a liner body 52 therebetween. The liner 46 may also include excess liner body 58 near the liner holding device 82. Additionally, as shown in FIG. 8, the first end 48 of the liner 46 may be attached to the liner holding device 82 outside of the manhole 10. The liner holding device 82 is a device to feed excess liner body 58 into the manhole 10, as needed. The device 82 may be a tripod, a winch, a pulley system, or some similar means of lowering excess liner into the manhole. It should be appreciated that other items may be used as a liner holding device 82, with the intent being to be able to lower the liner 46 into the manhole 10 as the liner body 52 is stretched circumferentially.

Figure 9:
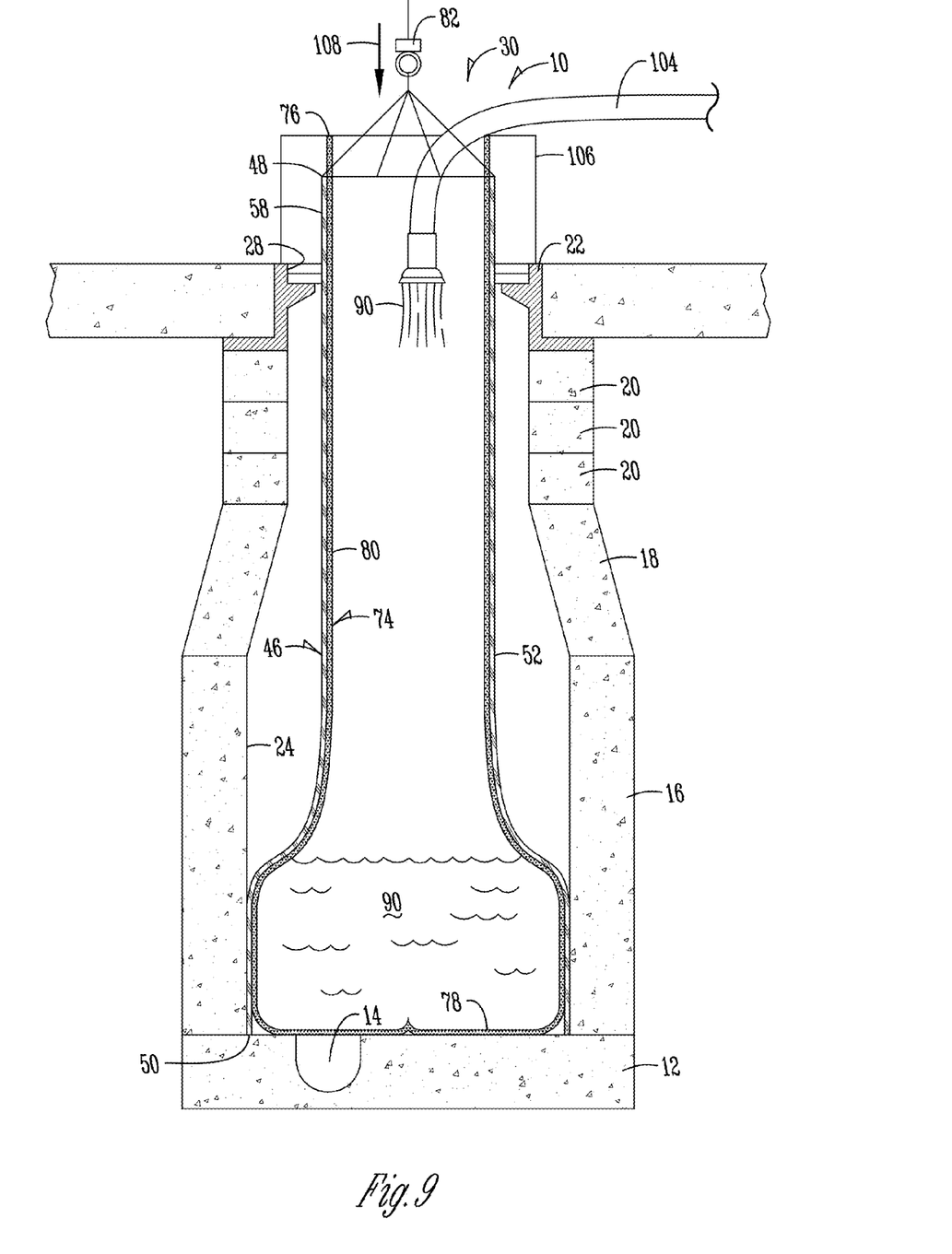
FIG. 9 is a sectional view similar to FIG. 8, but showing the bladder partially filled and expanded with a fluid.

Now referring to FIG. 9, the liner assembly 30 of FIG. 8 is shown, but with the bladder 74 partially filled and expanded with a fluid 90. The fluid 90, such as water or the like, is used to expand the bladder 74. The fluid 90 may be added to the bladder 74 by a hose 104. The hose 104 may be inserted into the liner assembly 30 and turned on to add water or the like into the bladder 74. As shown in FIG. 9, when the bladder 74 is being filled, this will occur first near a bottom end 78 of the bladder 74. Filling the bladder 74 with water will cause the bladder 74 to expand, which presses the liner 46 against the manhole wall 24. The liner 46 will stretch circumferentially towards the manhole wall 24, which will cause the liner 46 to shrink longitudinally. Because of this shrinkage, the liner 46 will require extra material to be pressed against the entire manhole wall 24. The extra material will come from the excess liner 58 that will be lowered and fed into the manhole 10 by the liner holding device 82. As seen in FIG. 9, the liner holding device 82 will move in the direction of the arrow 108 to feed the excess liner body 58 into the manhole 10. The rate of lowering must be equal to the rate of expansion of the liner 46 so as to ensure that no rips or tears will occur in the liner body 52. Those skilled in the art will appreciate there exists a variety of ways to control the rate at which the liner 46 is fed into the manhole 10, such as by measuring and controlling the amount of tension on the liner 46. As the liner expands, the tension is increased, signaling excess liner should be fed into the manhole.

Figure 10:
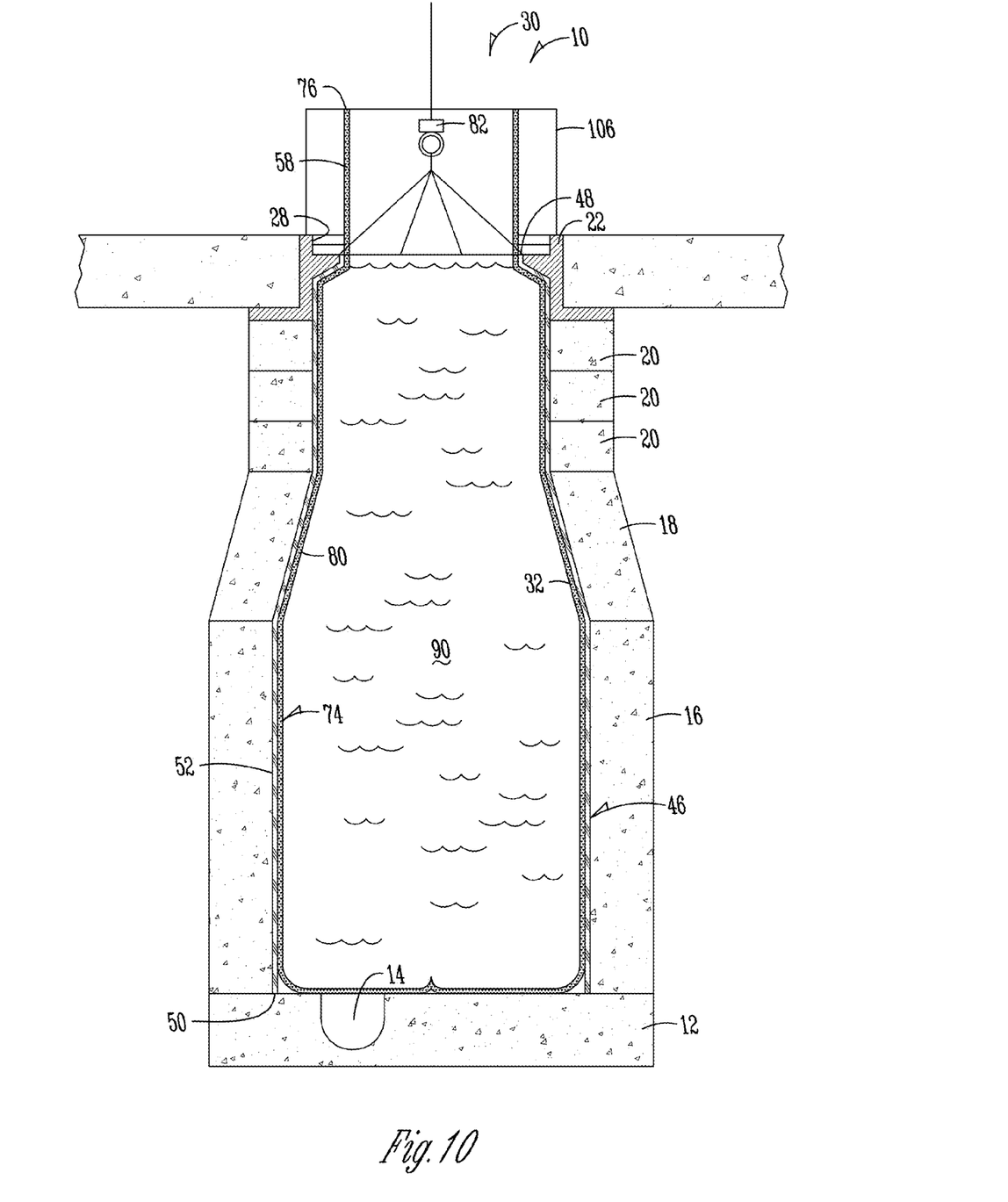
FIG. 10 is a sectional view similar to FIG. 9, but showing the bladder fully filled and expanded with a fluid.

FIG. 10 shows the liner assembly 30 of FIG. 9 fully filled with water 90 and fully expanded. When the bladder 74 is fully expanded, the liner 46 will be pressed against the entire manhole wall 24. The bladder 74 will be maintained at full expansion until the liner 46, which has been impregnated with the resinous material, has cured and hardened, thus fully repairing the manhole wall 24. As shown in FIG. 10, when the bladder 74 is fully filled and expanded, the liner holding device 82 will have been lowered to a position where the first end 48 of the liner 46 is near the manhole opening 28. While excess liner body 58 may still be outside the manhole 10 after full expansion, having less than the proper amount may cause the liner 46 to tear or rip. This will cause the manhole wall 24 to not be fully lined and repaired. Once the liner 46 has been pressed against the manhole wall 24, and the resinous material has been allowed to cure and harden, the water 90 is drained from the bladder 74 and the bladder is removed from the manhole 10. The manhole lid 26 is replaced and the result is a repaired manhole 10.

Figure 11:
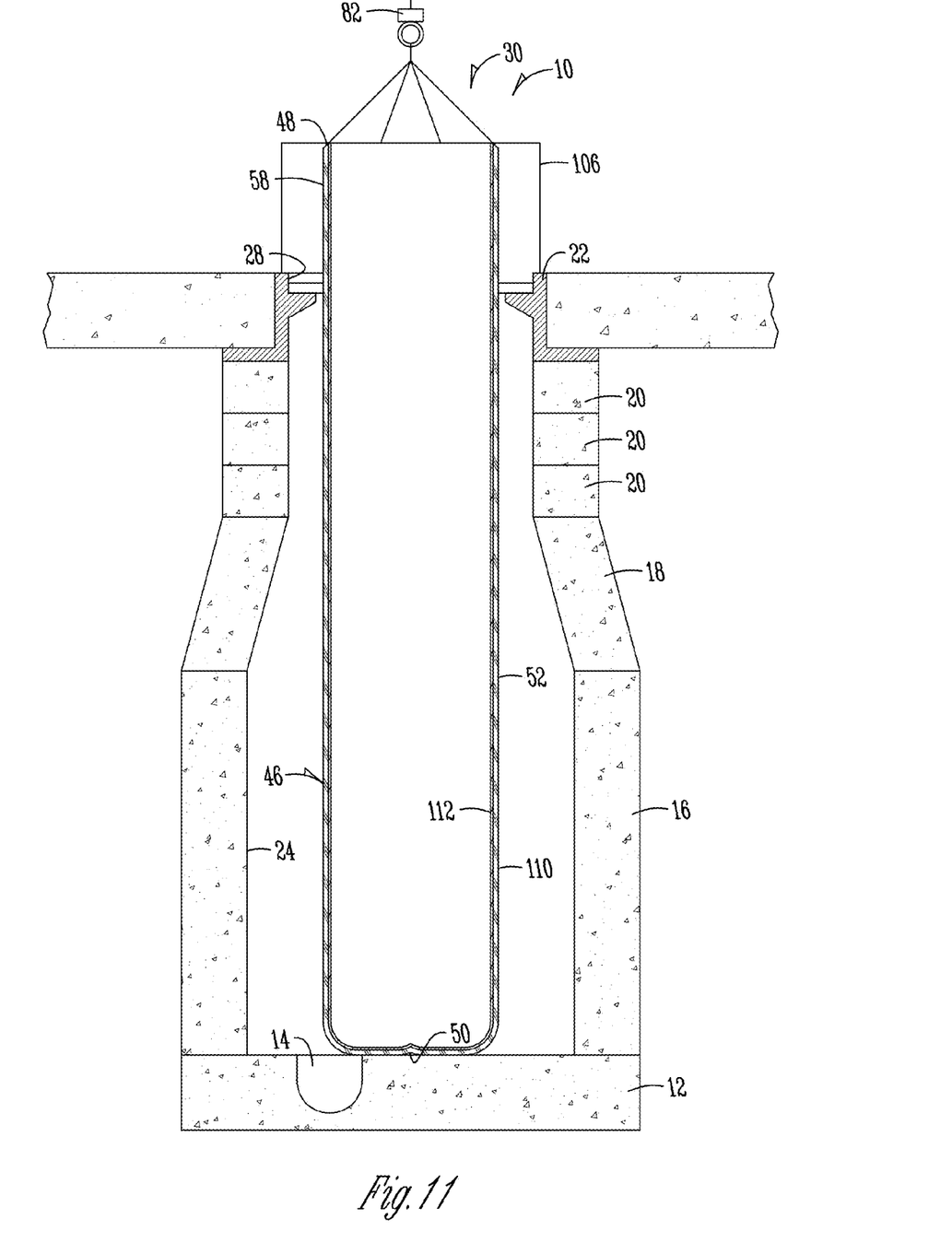
FIG. 11 is a section view of another embodiment of the present invention positioned in a manhole.

In an alternative to the embodiment illustrated in FIGS. 8-10, the liner assembly 30 does not include a bladder 74, but operates in a substantially similar manner. As shown in FIG. 11, the liner assembly 30 includes a liner 46 having an open first end 48, a closed second end 50, and a liner body 52 therebetween. The second end 50 of the liner 46 is sealed closed in this embodiment. In addition, the liner 46 comprises a resin absorbent layer 110 and a fluid impervious layer 112. The fluid impervious layer 112 may be an impermeable coating, film, or other layer, and is positioned on the interior of the liner 46. The resin absorbent layer may be a felt material, or the like, capable of absorbing and retaining a resinous material. The resin absorbent layer 110 is positioned on the exterior of the liner 46, such that the resin absorbent layer is adjacent and facing the walls 24 of the manhole 10. The resin absorbent layer 110 is impregnated with a resinous material and is positioned within the manhole. As shown and described in FIGS. 8-10, the first end 48 of the liner is connected to a liner holding device 82 outside of the manhole. Also as described above, a hose may be used to introduce a liquid into the liner. The fluid impervious layer 112 around the liner body 52 and the closed second end 50 of the liner 46 ensure that the liquid is contained within the liner. As the liner is stretchable, as noted above, the liner will be pressed against the wall of the manhole as more liquid is added to the interior of the liner until the length of the liner has been pressed fully against the wall of the manhole. The liner 46 will stretch circumferentially, similar to the way the bladder stretches as shown in FIGS. 9 and 10. Once full, the liner 46 will look similar to the filled liner assembly 30 shown in FIG. 10, minus the bladder and bladder base. The liquid is maintained in the liner until the resinous material is allowed to cure and harden. The liquid is removed from the liner. Finally, the closed second end 50 of the liner 46 may be cut out or otherwise removed to leave a repaired manhole 10.

The invention has been shown and described above with reference to preferred embodiments, and it is understood that modifications, substitutions, and additions may be made which are within the intended spirit and scope of the invention. The invention is only to be limited by claims appended hereto.

What is claimed is:

1. A method of lining a manhole wall having the advantage of minimizing the risk of tearing a liner, the method comprising:
   providing a liner impregnated with a resinous material capable of curing and hardening;
   positioning the liner in a manhole;
   positioning an auxiliary bladder inside the liner;
   positioning a primary bladder inside the liner;
   expanding an upper portion of the liner to press the upper portion of the liner against an upper portion of the wall of the manhole;
   after expanding and pressing the upper portion of the liner against the upper portion of the wall of the manhole, expanding a lower portion of the liner to press the lower portion against a lower portion of the wall of the manhole; and
   allowing the liner to cure and harden.

2. The method of claim 1 wherein the auxiliary bladder is positioned at the upper portion of the wall of the manhole.

3. The method of claim 1 wherein the auxiliary bladder is inflated to press the upper portion of the liner against the wall of the manhole.

4. The method of claim 1 wherein the primary bladder is positioned at least partially surrounding the auxiliary bladder.

5. The method of claim 1 wherein the primary bladder is inflated to press the lower portion of the liner against the wall of the manhole.

6. The method of claim 1 wherein the primary bladder is positioned substantially below the auxiliary bladder without substantially surrounding the auxiliary bladder.

7. The method of claim 6 wherein the step of expanding a lower portion of the liner to press the lower portion against a lower portion of the wall of the manhole comprises expanding the primary bladder against the inside of the liner and towards the manhole wall.

8. The method of claim 1 wherein the liner is sized to substantially the smallest diameter of the manhole.

9. The method of claim 8 wherein the liner is capable of stretching circumferentially to press against the manhole wall.

10. The method of claim 1 wherein the liner is sized less than the largest diameter of the manhole.

11. The method of claim 1 wherein the length of the liner decreases as the liner is pressed against the manhole wall.

12. The method of claim 1 wherein the thickness of the liner decreases as the liner is pressed against the manhole.

13. The method of claim 1 wherein the manhole includes a casting frame at an upper end of the manhole and the top portion of the liner is pressed against the casting frame.

14. A method of lining a manhole wall having the advantage of minimizing the risk of tearing a liner, the method comprising:
   providing a liner assembly including an expansion device, an auxiliary bladder operably connected to the expansion device, a primary bladder at least partially surrounding the auxiliary bladder, and a liner at least partially surrounding the primary bladder, said liner impregnated with a resinous material capable of curing and hardening;
   positioning the liner assembly in the manhole;
   expanding the auxiliary bladder to press an upper portion of the liner against an upper portion of the manhole wall;
   expanding the primary bladder to press a lower portion of the liner against a lower portion the manhole wall;
   allowing the liner to cure and harden; and
   removing the expansion device, auxiliary bladder, and primary bladder from the manhole.

15. The method of claim 14 wherein the resinous material is a thermoset resin.

16. The method of claim 15 further comprising heating the resinous material to increase the rate of curing and hardening.

17. The method of claim 16 wherein the auxiliary bladder is expanded by inflating the auxiliary bladder with steam.

18. The method of claim 17 wherein the primary bladder is expanded by inflating the primary bladder with steam.

19. The method of claim 14 wherein the auxiliary bladder is expanded by inflating the auxiliary bladder with ambient air.

20. The method of claim 19 wherein the primary bladder is expanded by inflating the primary bladder with ambient air.

21. The method of claim 14 wherein the primary bladder has a length substantially equal to the height of the manhole.

22. The method of claim 14 wherein the liner is sized substantially to the smallest diameter of the manhole and is capable of stretching circumferentially.

23. The method of claim 14 wherein the length of the liner decreases as the upper portion of the liner is pressed against the upper portion of the manhole wall.

24. A method of lining a manhole wall having the advantage of minimizing the risk of tearing a liner, the method comprising:
   providing a liner assembly including an auxiliary bladder operatively attached to an end cap toward a lower portion of the auxiliary bladder, a primary bladder at least partially surrounding the auxiliary bladder and end cap and extending below the auxiliary bladder and end cap, and a liner at least partially surrounding the primary bladder and adapted to be positioned between the primary bladder and the wall of the manhole;
   impregnating the liner with a material capable of curing and hardening;
   positioning the liner assembly in the manhole;
   expanding the auxiliary bladder to press an upper portion of the liner against an upper portion of the manhole wall;
   expanding the primary bladder to press a lower portion of the liner against a lower portion of the manhole wall;
   allowing the liner to cure and harden; and
   removing the auxiliary bladder, end cap, and primary bladder from the manhole.

25. The method of claim 24 wherein the auxiliary bladder and the primary bladder are expanded by separately inflating the bladders.

26. The method of claim 24 wherein the upper portion of the wall of the manhole comprises the portion of the wall extending upwardly from the approximate midpoint of the wall of the manhole.

* * * * *